(12) United States Patent
Nishimura et al.

(10) Patent No.: US 8,509,280 B2
(45) Date of Patent: Aug. 13, 2013

(54) GAS LASER OSCILLATOR APPARATUS AND GAS LASER MACHINING APPARATUS

(75) Inventors: Tetsuji Nishimura, Osaka (JP); Hiroyuki Hayashikawa, Osaka (JP); Nobuo Shinno, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/260,765

(22) PCT Filed: Apr. 7, 2010

(86) PCT No.: PCT/JP2010/002531
§ 371 (c)(1),
(2), (4) Date: Sep. 28, 2011

(87) PCT Pub. No.: WO2010/134256
PCT Pub. Date: Nov. 25, 2010

(65) Prior Publication Data
US 2012/0051385 A1   Mar. 1, 2012

(30) Foreign Application Priority Data

May 21, 2009   (JP) .................................. 2009-122885

(51) Int. Cl.
*H01S 3/22*   (2006.01)
(52) U.S. Cl.
USPC .......................................................... 372/58
(58) Field of Classification Search
USPC ................................ 257/E21.214, 98; 438/32
See application file for complete search history.

(56) References Cited

U.S. PATENT DOCUMENTS

2008/0056325 A1   3/2008   Ohta et al.

FOREIGN PATENT DOCUMENTS

| CN | 101141043 A | 3/2008 |
|---|---|---|
| JP | 62-224720 A | 10/1987 |
| JP | 2001-116041 A | 4/2001 |
| JP | 2001-116041 A | 4/2001 |
| JP | 2005-030543 A | 2/2005 |
| JP | 2005-030543 A | 2/2005 |
| JP | 2005-221042 A | 8/2005 |
| JP | 2008-060511 A | 3/2008 |
| JP | 2008-215568 A | 9/2008 |
| JP | 2008-215568 A | 9/2008 |

OTHER PUBLICATIONS

International Search Report for Application No. PCT/JP2010/002531, May 11, 2010, Panasonic Corporation.

*Primary Examiner* — Jessica Stultz
*Assistant Examiner* — Tuan Nguyen
(74) *Attorney, Agent, or Firm* — RatnerPrestia

(57) ABSTRACT

The gas laser oscillator apparatus of the present invention has a temperature-detecting mechanism disposed at the bearings of the bellows section. The temperature-detecting mechanism detects temperature rise in the bearings and calculates a maintenance cycle with reference to the predetermined data on relationship between temperature and the lifetime of the bearings. Disposed at the bearings, the temperature-detecting mechanism outputs a signal that indicates a replacement cycle according to the temperature of the bearings. More preferable, the temperature-detecting mechanism has a sensor at a tip end of a spring having a pressure force smaller than a load applied to the bearings in advance. To enhance accuracy of temperature detection, the spring is wrapped around with heat insulating material so as not to be exposed to outside temperature.

7 Claims, 3 Drawing Sheets

GAS LASER OSCILLATOR APPARATUS AND GAS LASER MACHINING APPARATUS

This Application is a U.S. National Phase Application of PCT International Application PCT/JP2010/002531.

TECHNICAL FIELD

The present invention relates to a gas laser oscillator apparatus and a gas laser machining apparatus, which are mainly used for sheet-metal cutting and welding.

BACKGROUND ART

FIG. 4 schematically shows a structure of a conventional axial gas laser oscillator apparatus. Hereinafter, the structure of a conventional axial gas laser oscillator apparatus will be described with reference to FIG. 4. Discharge tube 901 is made of dielectric material, such as glass. As shown in FIG. 4, electrodes 902 and 903 are disposed in the periphery of discharge tube 901. Power supply 904 is connected to electrodes 902 and 903. Discharge space 905 is formed between electrode 902 and electrode 903 in discharge tube 901. Total reflection mirror 906 and partial reflection mirror 907, which are fixed at each end of discharge space 905, form an optical resonator. Laser beam 908 passes through partial reflection mirror 907 of the optical resonator. Black arrows in FIG. 4 represent the flowing direction of laser gas stream 909 as an amplified medium of the optical resonator. Laser gas stream 909 circulates around laser-gas flow passage 910 of the axial gas laser oscillator apparatus. Bellows section 913 circulates laser gas stream 909, by which laser gas stream 909 flows in discharge space 905 at a current speed of approx. 100 m/sec. Heat exchangers 911 and 912 cool down laser gas stream 909 heated by discharge in discharge space 905 and by the operation of bellows section 913. Laser-gas flow passage 910 communicates with discharge tube 901 at laser-gas leading section 914.

FIG. 5 is a perspective view showing a schematic structure of a conventional gas laser machining apparatus used for sheet-metal cutting. Hereinafter, the conventional gas laser machining apparatus will be described with reference to FIG. 5.

As shown in FIG. 5, laser beam 908 emitted from gas laser oscillator apparatus 900 is reflected off reflection mirror 915 and is guided close to work 916. Laser beam 908 is collected into a high-density energy beam by collecting lens 918 disposed inside torch 917. Irradiated with the energy beam, work 916 fixed on process table 919 undergoes cutting.

Torch 917 moves parallel to plane 919a of process table 919. The relative movement of torch 917 allows work 916 to be processed into a predetermined shape. Torch 917 is driven by X-axis motor 920 or Y-axis motor 921. The conventional gas laser oscillator apparatus and a gas laser machining apparatus are thus structured.

Next, the workings of the apparatus will be described. As shown in FIG. 4, laser gas stream 909 fed from bellows section 913 runs laser-gas flow passage 910 and enters through laser-gas leading section 914 into discharge tube 901. Electrodes 902 and 903 connected to power supply 904 generate a discharge in discharge space 905. Having the discharge energy, laser gas stream 909 in discharge space 905 is pumped. The optical resonator, which is formed of total reflection mirror 906 and partial reflection mirror 907, allows pumped laser gas stream 909 to be in a resonant condition, so that partial reflection mirror 907 outputs laser beam 908. As shown in FIG. 5, laser beam 908 is used for laser-beam machining.

FIG. 6 shows a structure of the bellows section of a conventional gas laser oscillator apparatus. Motor rotor 922 is connected with rotating shaft 923. Impeller 924 is disposed at a tip of rotating shaft 923. Motor stator 926 is secured to supporting member 925 so as to be disposed concentric with motor rotor 922. Receiving AC power from outside, motor stator 926 generates a rotating magnetic field, by which motor rotor 922 rotates. The rotation of motor rotor 922 rotates rotating shaft 923 and impeller 924. In this way, rotating impeller 924 provides laser gas stream 909. Bearings 928 are fixed to rotating shaft 923 at upper and lower sections thereof. Rotating shaft 923 is rotatably retained by bearings 928. Bellows section 913 has a rotating section and a non-rotating section. The rotating section is formed of motor rotor 922, rotating shaft 923, impeller 924, and bearings 928.

The periphery of each of bearings 928 is connected to supporting member 925 as a component of the non-rotating section. Grease 929 is applied to bearings 928 for lubrication.

To lubricate the bearings, for example, Patent Literature 1 introduces a structure in which a grease applying/collecting means is disposed close to the bearings. The conventional gas laser oscillator apparatus, however, has the following problem.

In gas laser oscillator apparatus 900, bellows section 913 is one of the components needing periodic replacement; in particular, bearing 928 is the shortest service life and the lifetime thereof greatly depends on the amount of grease 929. Generally, grease 929 is a volatile substance. Therefore, grease 929 decreases with time since the rotation start of the rotating shaft having impeller 924. Decrease in grease 929 degrades the lubricating performance of grease 929, accelerating wear of bearing 928 and resulting in the short-lived bearing.

Preferably, bellows section 913 should be periodically replaced with a new one, for example, at each periodical inspection. However, if the inspection result tells that bearing 928 seems to be still usable, some users may keep using it without replacement from a cost standpoint. In the worst case, bearing 928 has a sudden breakage without waiting for the next inspection, and accordingly, the whole structure of bellows section 913 has to be halted for a long period.

CITATION LIST

Patent Literature

Patent Literature 1: Japanese Unexamined Patent Application Publication No. 2005-221042

SUMMARY OF THE INVENTION

The present invention provides a gas laser oscillator apparatus capable of detecting the lifetime of the bearing of the bellows section so as to prevent the bellows section from a sudden stop during operations.

The gas laser oscillator apparatus has a discharge section for exciting laser gas as a laser medium, a bellows section for supplying the laser gas, and a laser-gas flow passage as the circulation path between the discharge section and the bellows section. The bellows section further contains a rotating shaft having an impeller at a tip end, a driver for rotating the rotating shaft, a plurality of bearings fixed to the rotating shaft, and a temperature-detecting mechanism that makes contact with the bearings. The temperature-detecting mechanism has a controller that outputs a signal indicating a replacement cycle of the bellows section according to the temperature of the bearings.

The aforementioned structure detects the lifetime of the bearings of the bellows section, preventing the device from a sudden stop during operations, i.e., preventing an interruption of laser-beam output of the gas laser oscillator apparatus. The structure reduces an unexpected stop of the production line containing the gas laser oscillator apparatus.

The gas laser machining apparatus of the present invention has the gas laser oscillator apparatus described above and an optical system that leads a laser beam emitted from the gas laser oscillator apparatus to the work.

The structure detects the lifetime of the bearings of the bellows section, preventing the device from a sudden stop during operations, i.e., eliminating an interruption of output of the laser beam of the gas laser oscillator apparatus. The structure reduces an unexpected stop of the production line containing the gas laser oscillator apparatus.

DETAILED DESCRIPTION OF THE PREFERRED EMBODIMENTS

Hereinafter, an exemplary embodiment of the present invention is described with reference to the accompanying drawings. Throughout the drawings, like parts have similar reference marks, and the description thereof may be omitted.

First Exemplary Embodiment

Figure 1:
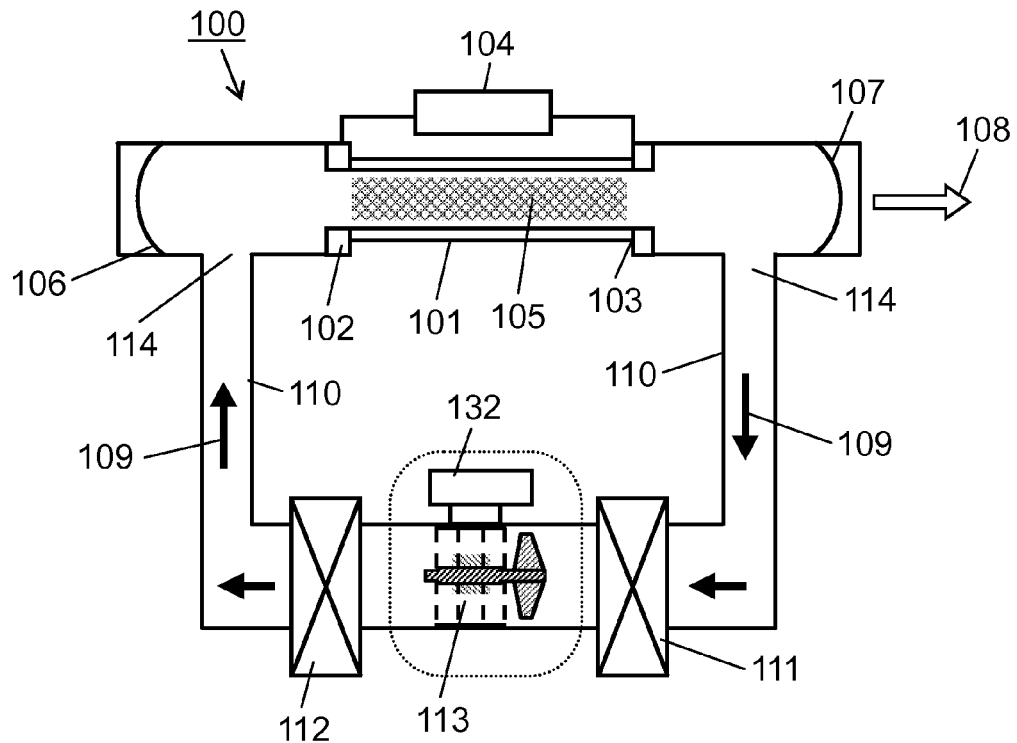
FIG. 1 is a schematic view showing the structure of a gas laser oscillator apparatus in accordance with a first exemplary embodiment of the present invention.

FIG. 1 is a schematic view showing the structure of an axial gas laser oscillator apparatus in accordance with the first exemplary embodiment of the present invention.

Axial gas laser oscillator apparatus 100 of the embodiment has discharge tube 101, electrodes 102 and 103, power supply 104, total reflection mirror 106, partial reflection mirror 107, laser-gas flow passage 110, heat exchangers 111 and 112, bellows section 113, and laser-gas leading section 114.

Discharge tube 101 is made of dielectric material, such as glass. Electrodes 102 and 103 are disposed in the periphery of discharge tube 101. Power supply 104 is connected to electrodes 102 and 103. Discharge space 105 is formed between electrode 102 and electrode 103 in discharge tube 101. Total reflection mirror 106 and partial reflection mirror 107, which are fixed at each end of discharge space 105, form an optical resonator. Laser beam 108 emitted from partial reflection mirror 107 is represented by arrow 108.

Laser gas stream 109, which is represented by black arrows (arrow 109) in FIG. 1, circulates around laser-gas flow passage 110 in axial gas laser oscillator apparatus 100. Heat exchangers 111 and 112 cool down laser gas stream 109 heated by discharge in discharge space 105 and by bellows section 113. Bellows section 113 circulates laser gas stream 109, by which laser gas stream 109 flows in discharge space 105 at a current speed of approx. 100 m/sec. Laser-gas flow passage 110 communicates with discharge tube 101 at laser-gas leading section 114.

As shown in FIG. 1, gas laser oscillator apparatus 100 has a discharge section, bellows section 113, and laser-gas flow passage 110. The discharge section has discharge tube 101, electrodes 102 and 103, and power supply 104. Flowing into discharge space 105, laser gas stream 109 as a laser medium is excited by discharge generated by the discharge section. Gas laser oscillator apparatus 100 is thus structured.

Next, the workings of gas laser oscillator apparatus 100 will be described.

Laser gas stream 109 fed from bellows section 113 runs laser-gas flow passage 110 and enters through laser-gas leading section 114 into discharge tube 101. Electrodes 102 and 103 connected to power supply 104 generate a discharge in discharge space 105. Having the discharge energy, laser gas stream 109 in discharge space 105 is excited.

The optical resonator, which is formed of total reflection mirror 106 and partial reflection mirror 107, allows excited laser gas stream 109 to be in a resonant condition, so that partial reflection mirror 107 outputs laser beam 108. Such obtained laser beam 108 is used for laser-beam machining.

Figure 2:
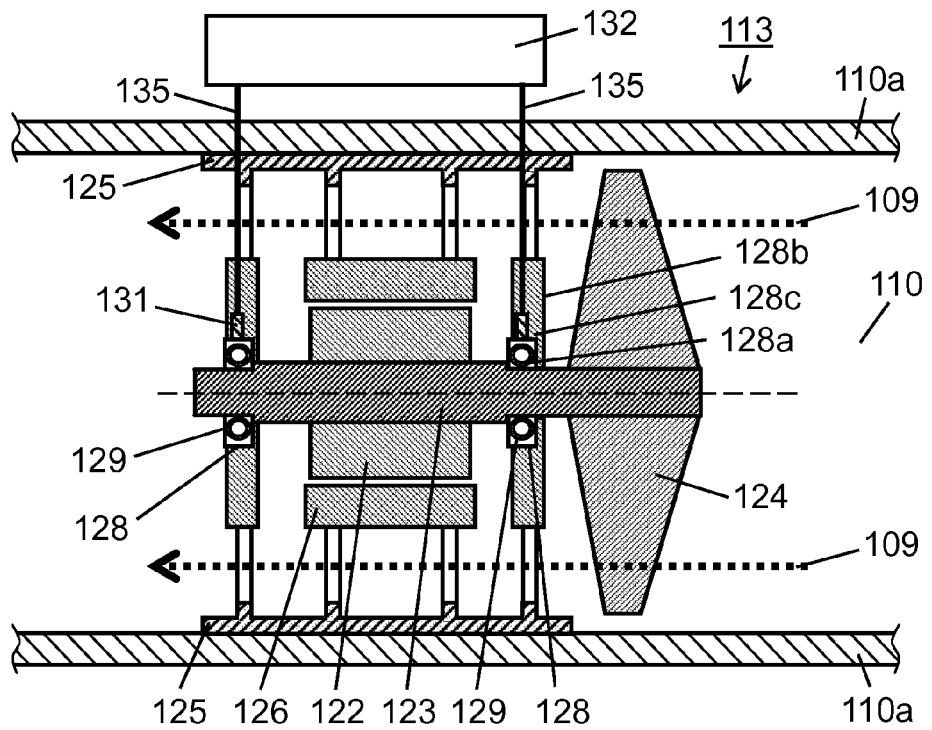
FIG. 2 is a sectional view showing a structure of the bellows section of the gas laser oscillator apparatus in accordance with the first exemplary embodiment.

FIG. 2 is a sectional view showing a structure as a first example of bellows section 113 of gas laser oscillator apparatus 100 in accordance with the first exemplary embodiment. FIG. 2 shows an in-detail structure of bellows section 113 disposed in laser-gas flow passage 110. As shown in FIG. 2, motor rotor 122 is connected with rotating shaft 123. Impeller 124 is disposed at a tip of rotating shaft 123. Motor stator 126 is secured to supporting member 125 so as to be disposed concentric with motor rotor 122.

Supporting member 125 holds the components of bellows section 113 so as to secure them to outer wall 110a of laser gas flow passage 110, enhancing a smooth flow of laser gas stream 109. Receiving AC power from outside wiring (not shown), motor stator 126 generates a rotating magnetic field, by which motor rotor 122 rotates. The rotation of motor rotor 122 rotates rotating shaft 123 and impeller 124. In this way, rotating impeller 124 provides laser gas stream 109. Bearings 128 are fixed to rotating shaft 123 at upper and lower sections thereof. Rotating shaft 123 is rotatably retained by bearings 128.

Bellows section 113 has rotating shaft 123 having impeller 124 at a tip end, a driver containing motor stator 126 and motor rotor 122 that rotates rotating shaft 123, a plurality of bearings 128, and a temperature-detecting mechanism. Bearings 128 are fixed to rotating shaft 123. The temperature-detecting mechanism having temperature sensor 131 makes contact with bearings 128. The temperature-detecting mechanism has controller 132 that outputs a signal indicating a replacement cycle of bellows section 113 according to the temperature of bearings 128, which will be described later.

Bellows section 113 has a rotating section and a non-rotating section. The rotating section is formed of motor rotor 122, rotating shaft 123, impeller 124, and inner ring 128a of bearing 128. Inner ring 128a of bearing 128 is fixed to rotating shaft 123. Outer ring 128b of bearing 128 is press-fitted into supporting member 125.

Temperature-detecting head (temperature sensor) 131 is disposed at each of bearings 128 and serves as a sensor. Bearing 128 has a "gappy" structure. Due to the structural feature, grease 129 decreases over time by volatilization through the gap. Decrease in grease 129 degrades the lubricating performance of grease 129, increasing friction and therefore heat in bearing 128. Detecting the increased heat, temperature sensor 131 outputs a signal to controller 132 via signal line 135. Receiving the signal, controller 132 detects temperature rise by heat occurred at bearings 128, and determines the lifetime of bearings 128 on the estimation according to the temperature rise. Controller 132 may estimate the lifetime of the bearings with reference to the storage section (not shown) as a part of controller 132 in which data on relationship between temperature rise and the lifetime of the bearings is stored in advance. For example, such data may be formed into a calculation formula for lifetime estimation. Temperature sensor 131 directly adjacent to bearings 128 and controller 132 works as a temperature-detecting mechanism. In this way, controller 132 outputs a signal indicating a replacement cycle of bellows section 113 by detecting the temperature or temperature rise of bearings 128.

As described above, the structure detects the lifetime of bearings 128 of bellows section 113, preventing the device from a sudden stop during operations, i.e., eliminating an interruption of output of laser beam 108 of gas laser oscillator apparatus 100. The structure reduces an unexpected stop of the production line containing gas laser oscillator apparatus 100.

Figure 3:
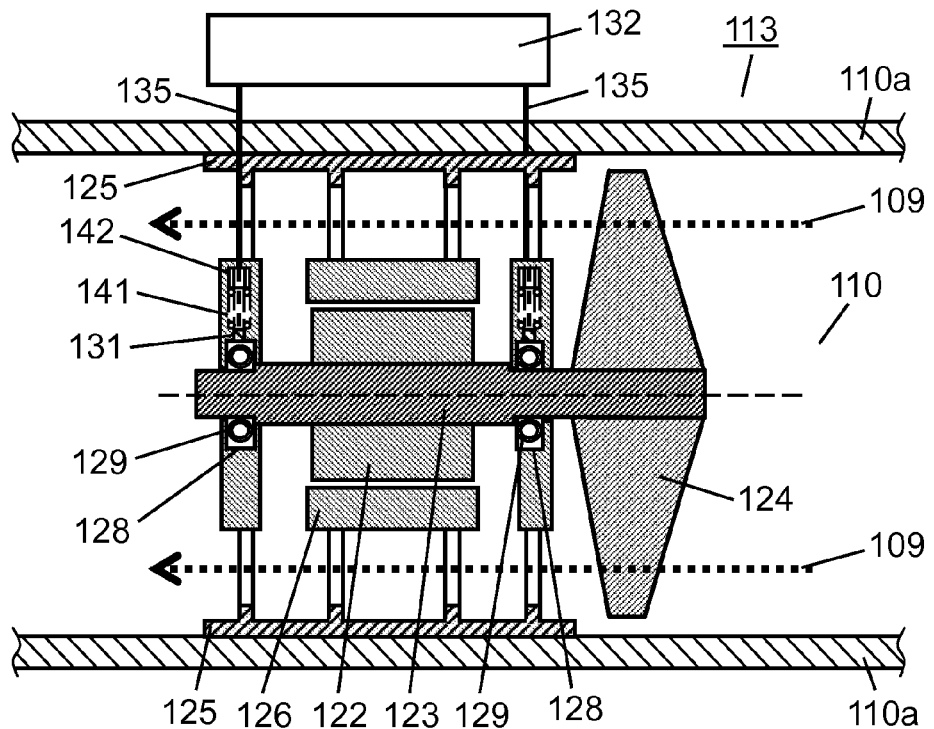
FIG. 3 is a sectional view showing another structure of the bellows section of the gas laser oscillator apparatus in accordance with the first exemplary embodiment.
Figure 4:
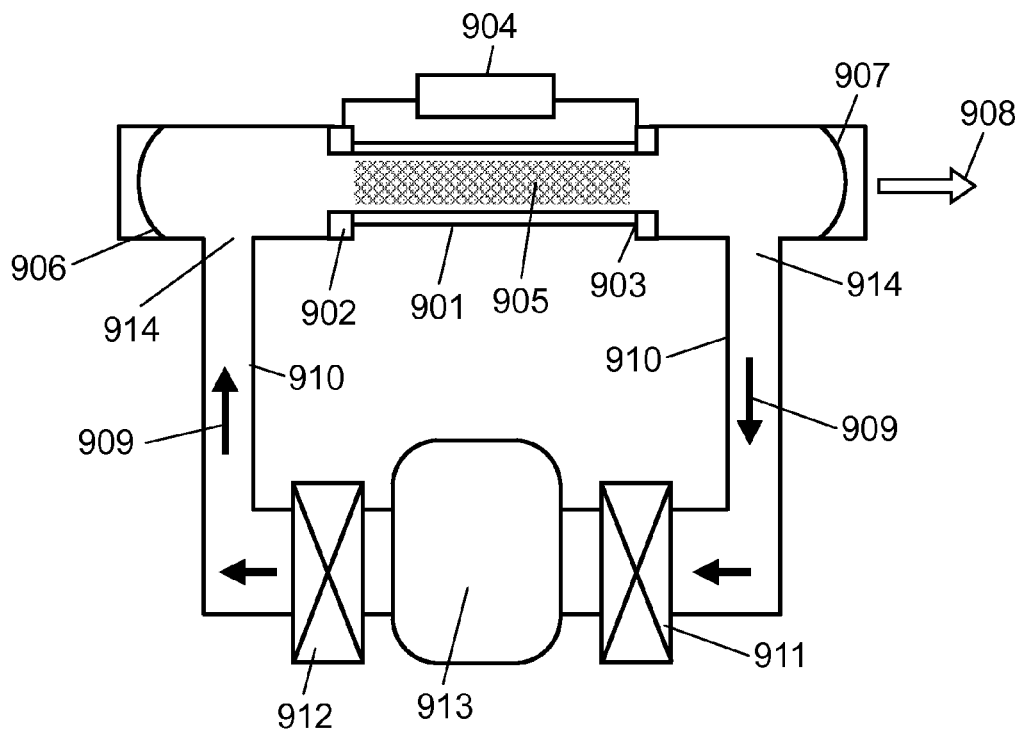
FIG. 4 shows a structure of a conventional gas laser oscillator apparatus.

FIG. 3 is a sectional view showing a structure as a second example of bellows section 113 of gas laser oscillator apparatus 100 in accordance with the first exemplary embodiment.

As shown in FIG. 3, temperature sensor 131 is disposed as a sensor at bearing 128. Temperature sensor 131 is attached to spring 141 having a weak force such that rotation of the rotating section is not interrupted thereby. That is, the sensor is disposed on a tip of spring 141 having a pressure force smaller than that of pre-loaded bearing 128. For accurate detection of temperature, spring 141 may be wrapped with a heat insulating material so as not to be exposed to outside temperature. The insulating material not only serves as a protector for the spring but also enhances accuracy of temperature detection of bearings 128.

Spring 141 is held by shaft 142 inserted between bearing 128 and outer wall 110a of the laser-gas flow passage. The structure protects signal line 135 from breaking of wire caused by vibration of the rotating section, enhancing reliability of the apparatus.

In this way, the structure of the present invention predicts the lifetime of bearings 128 of bellows section 113, preventing the apparatus from a sudden stop during operations. As a result, an unexpected line stop during operations is greatly reduced.

Figure 5:
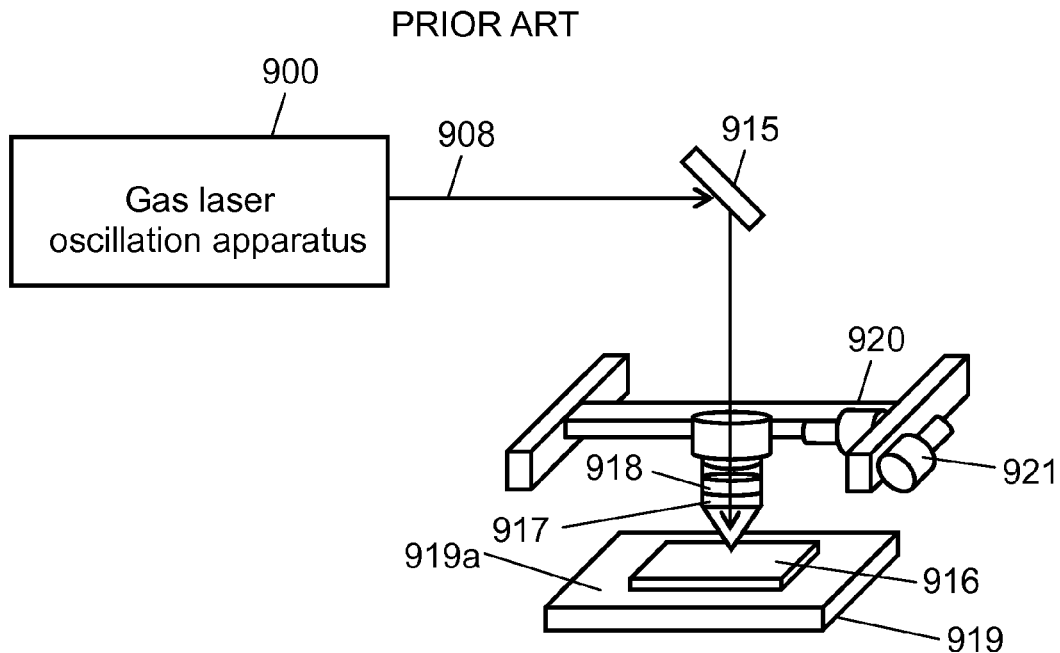
FIG. 5 is a perspective view showing the structure of a conventional gas laser machining apparatus.
Figure 6:
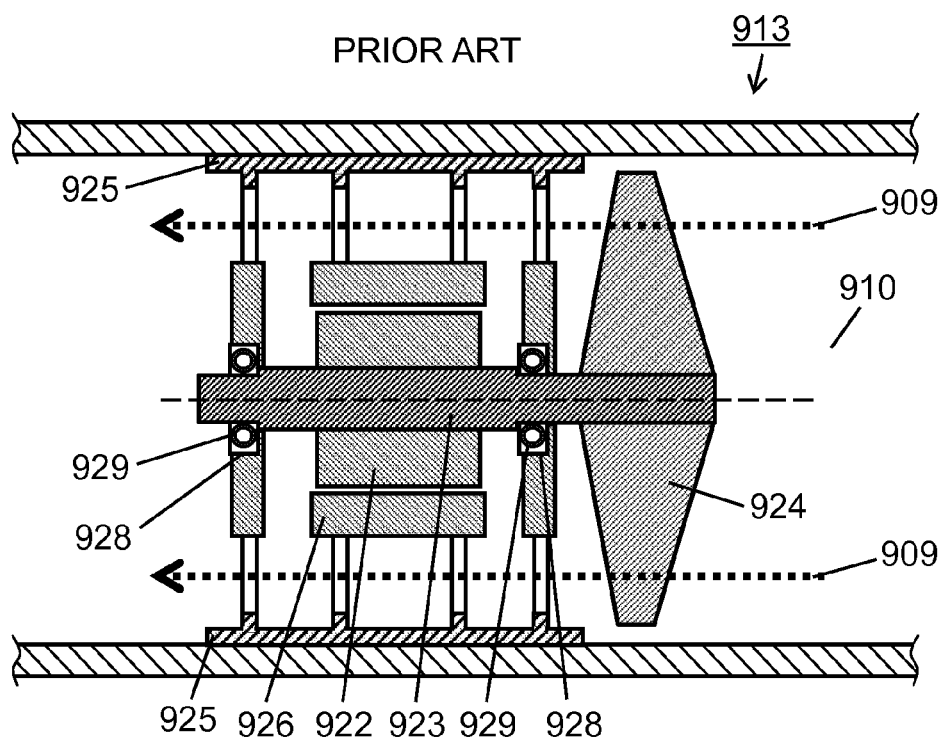
FIG. 6 shows a structure of the bellows section of a conventional gas laser oscillator apparatus.

Besides, the present invention provides a gas laser machining apparatus, as is shown in the conventional example of FIG. 5, as an integrated structure of gas laser oscillator apparatus 100 of the embodiment and an optical system that leads laser beam 108 emitted from apparatus 100 to the work.

The aforementioned structure detects the lifetime of bearings 128 of bellows section 113, preventing the apparatus from a sudden stop during operations, i.e., eliminating an interruption of output of laser beam 108 of gas laser oscillator apparatus 100. The structure reduces an unexpected stop of the production line containing gas laser oscillator apparatus 100.

The laser gas oscillator apparatus of the present invention has a discharge section, a bellows section, and a laser-gas flow passage. Laser gas as a laser medium is excited, in the form of a laser gas stream, by the discharge section. The bellows section feeds laser gas in the form of a laser gas stream. The laser-gas flow passage circulates laser gas in the form of a laser gas stream between the discharge section and the bellows section. The bellows section further contains a rotating shaft having an impeller at a tip end, a driver for rotating the rotating shaft, a plurality of bearings fixed to the rotating shaft, and a temperature-detecting mechanism that makes contact with the bearings. The temperature-detecting mechanism has a controller that outputs a signal indicating a replacement cycle of the bellows section according to the temperature of the bearings.

The aforementioned structure detects the lifetime of the bearings of the bellows section, preventing the device from a sudden stop during operations, i.e., eliminating an interruption of output of the laser beam of the gas laser oscillator apparatus. The structure reduces an unexpected stop of the production line containing the gas laser oscillator apparatus.

As an aspect of the present invention, the temperature-detecting mechanism has a sensor having a direct contact with a damper that holds the outer ring of the bearing. The structure enables the sensor to directly detect the temperature of the bearing.

The structure above enhances accuracy of temperature detection of the bearing, contributing to a well-timed replacement of the bellows section.

As another aspect of the present invention, the temperature-detecting mechanism has a sensor at a tip of a spring having a pressure force smaller than that of the pre-loaded bearing. The spring is wrapped with a heat insulating material. The insulating material protects the spring from being exposed to the outside temperature.

The structure above enhances accuracy of temperature detection of the bearing, contributing to a well-timed replacement of the bellows section.

The gas laser machining apparatus of the present invention has the gas laser oscillator apparatus described above and an optical system that leads a laser beam emitted from the gas laser oscillator apparatus to the work.

The structure detects the lifetime of the bearings of the bellows section, preventing the device from a sudden stop during operations, i.e., eliminating an interruption of output of the laser beam of the gas laser oscillator apparatus. The structure reduces an unexpected stop of the production line containing the gas laser oscillator apparatus.

INDUSTRIAL APPLICABILITY

The present invention provides a gas laser oscillator apparatus and a gas laser machining apparatus capable of predicting the lifetime of the bearings. The structure allows the users to know the exact timing of maintenance for the bellows section.

REFERENCE MARKS IN THE DRAWINGS 100 gas laser oscillator apparatus
101 discharge tube
102, 103 electrode
104 power supply
105 discharge space
106 total reflection mirror
107 partial reflection mirror
108 laser beam
109 laser gas stream
110 laser-gas flow passage
110a outer wall
111, 112 heat exchanger
113 bellows section 114 laser gas leading section
122 motor rotor
123 rotating shaft
124 impeller
125 supporting member
126 motor stator
128 bearing
128a inner ring
128b outer ring
128c damper
129 grease
131 temperature-detecting head (temperature sensor)
132 controller
135 signal line
141 spring
142 shaft

The invention claimed is:

1. A gas laser oscillator apparatus comprising:
a discharge section for exciting laser gas as a laser medium;
a bellows section for feeding the laser gas further including:
  a rotating shaft having an impeller at a tip end;
  a driver for rotating the rotating shaft;
  a plurality of bearings connected to the rotating shaft; and
  a temperature-detecting mechanism with a controller, the temperature-detecting mechanism having temperature sensors, the temperature sensors contacting with the bearings; and
a laser-gas flow passage as a circulation path between the discharge section and the bellows section,
wherein,
a grease made of a volatile substance is applied to the bearings for lubrication,
the temperature sensors detect temperature of the bearings, and
the controller of the temperature-detecting mechanism outputs a signal that indicates a replacement cycle of the bellows section according to temperature of the bearings with reference to a data on relationship between rise of the temperature and a lifetime of the bearings, the data is stored in the controller, and
the temperature-detecting mechanism has a sensor on a tip end of a spring having a pressure force smaller than a load applied to the bearings, and the sensor detects temperature of the bearings in a manner that the spring is wrapped around with heat insulating material so as not to be exposed to outside temperature.

2. The gas laser oscillator apparatus of claim 1, wherein the temperature-detecting mechanism contains a sensor having a direct contact with a damper that holds an outer ring of each of the bearings, allowing the sensor to directly detect temperature of the bearings.

3. A gas laser machining apparatus comprising:
a gas laser oscillator apparatus described in claim 1; and
an optical system for transmitting a laser beam emitted from the gas laser oscillator apparatus.

4. A gas laser machining apparatus comprising:
a gas laser oscillator apparatus described in claim 2; and
an optical system for transmitting a laser beam emitted from the gas laser oscillator apparatus.

5. A gas laser oscillator apparatus comprising:
a discharge section for exciting laser gas as a laser medium;
a bellows section for feeding the laser gas further including:
  a rotating shaft having an impeller at a tip end;
  a driver for rotating the rotating shaft;
  a plurality of bearings connected to the rotating shaft; and
  a temperature-detecting mechanism with a controller, the temperature-detecting mechanism having temperature sensors, the temperature sensors contacting with the bearings,
wherein,
  the temperature-detecting mechanism has a sensor on a tip end of a spring having a pressure force smaller than a load applied to the bearings,
the sensor detects temperature of the bearings in a manner that the spring is wrapped around with heat insulating material so as not to be exposed to outside temperature, and
  the controller of the temperature-detecting mechanism outputs a signal that indicates a replacement cycle of the bellows section according to temperature of the bearings.

6. The gas laser oscillator apparatus of claim 5, wherein the temperature-detecting mechanism contains a sensor having a direct contact with a damper that holds an outer ring of each of the bearings, allowing the sensor to directly detect temperature of the bearings.

7. A gas laser machining apparatus comprising:
a gas laser oscillator apparatus described in claim 5; and
an optical system for transmitting a laser beam emitted from the gas laser oscillator apparatus.

* * * * *